Oct. 9, 1956   W. DE BACK ET AL   2,765,829
PINEAPPLE SIZER HAVING COMPRESSED AIR EJECTING MEANS
Filed June 29, 1952   5 Sheets-Sheet 1

INVENTORS
WILLIAM DE BACK
SAMUEL A. MENCACCI
BY Hans G. Hoffmeister
ATTORNEY

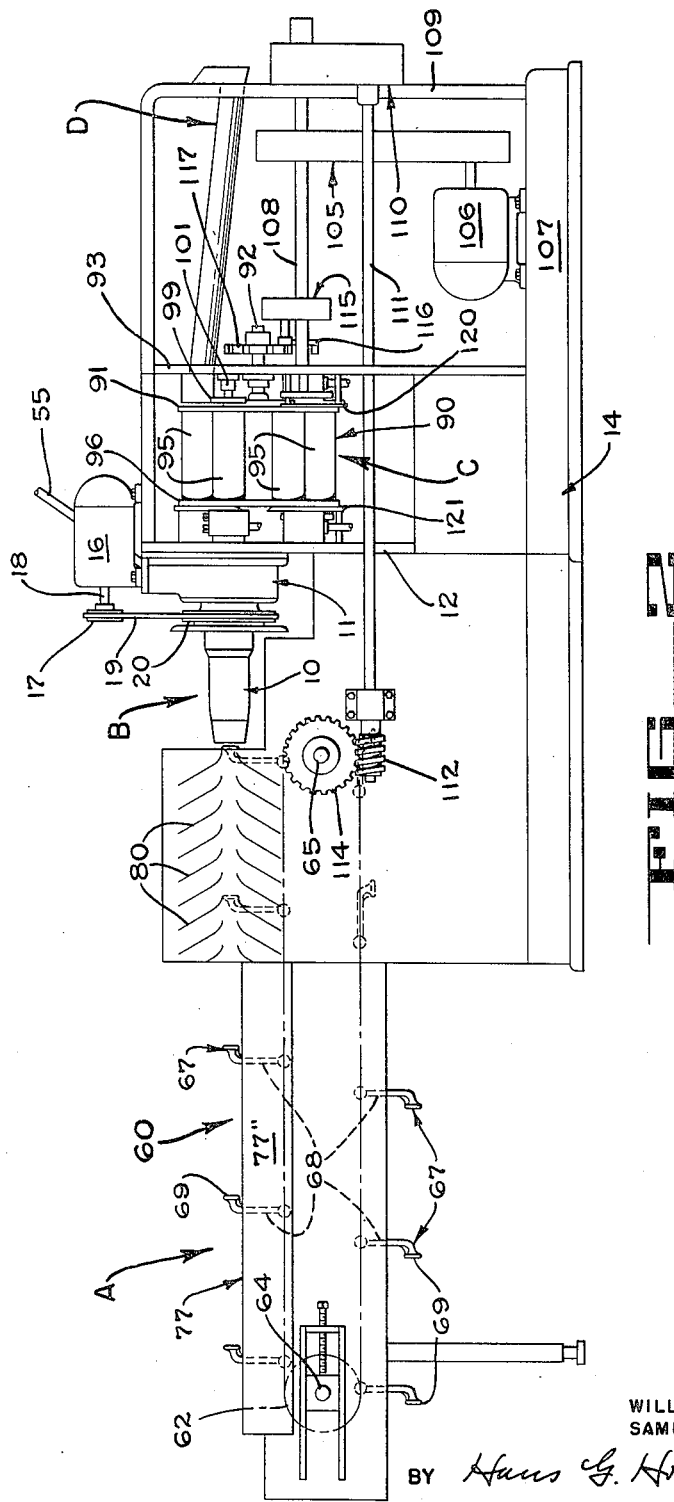

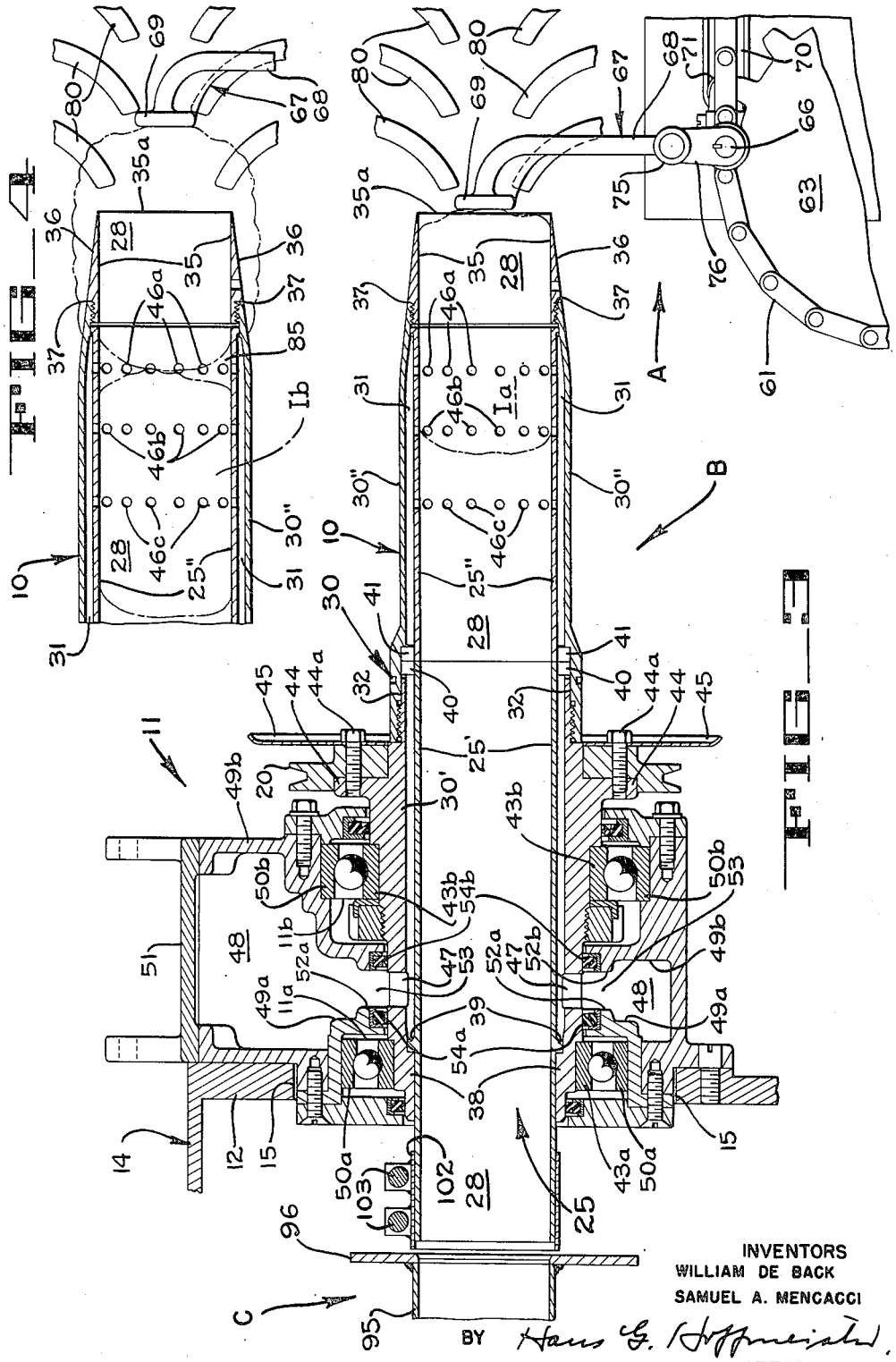

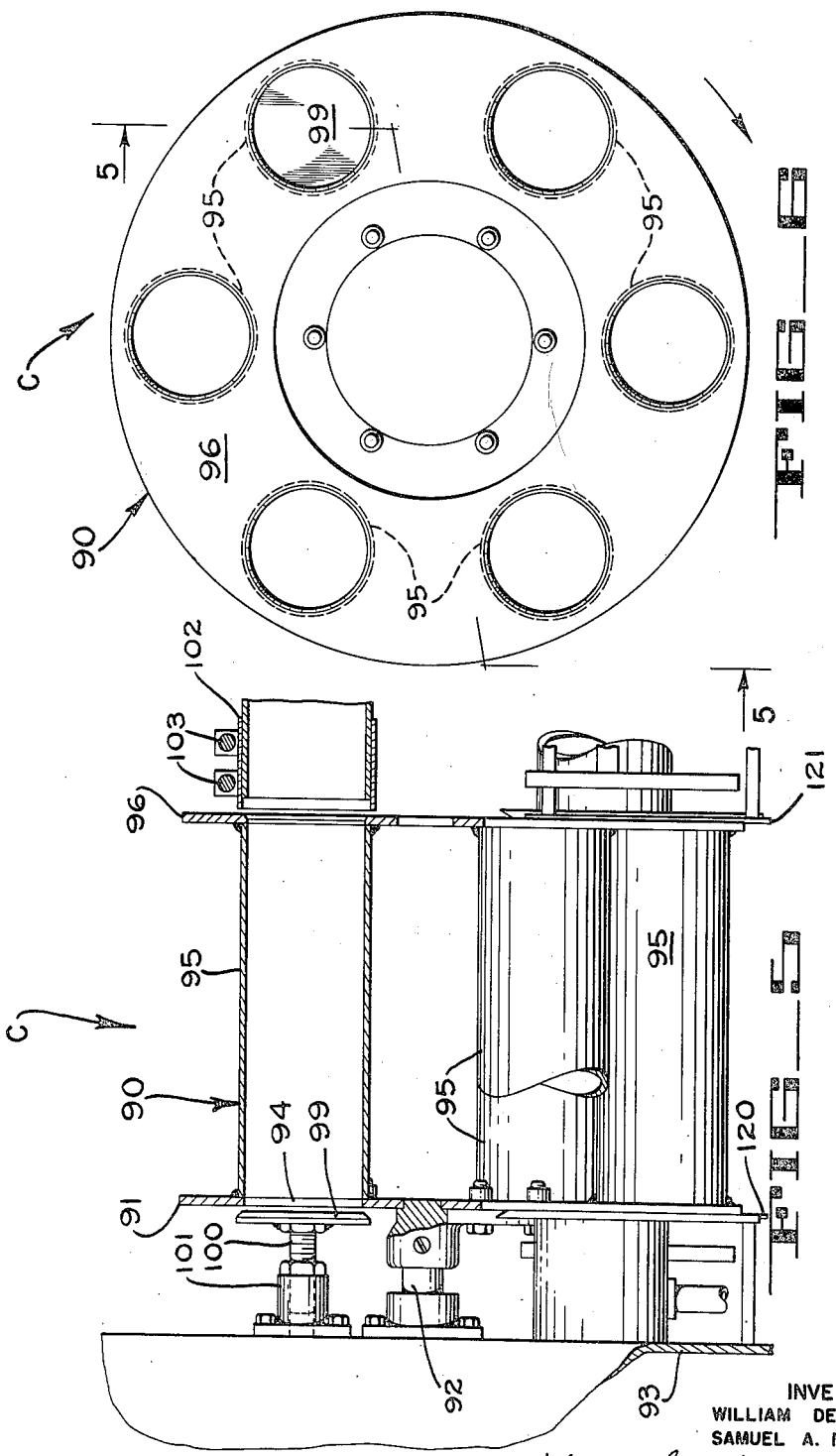

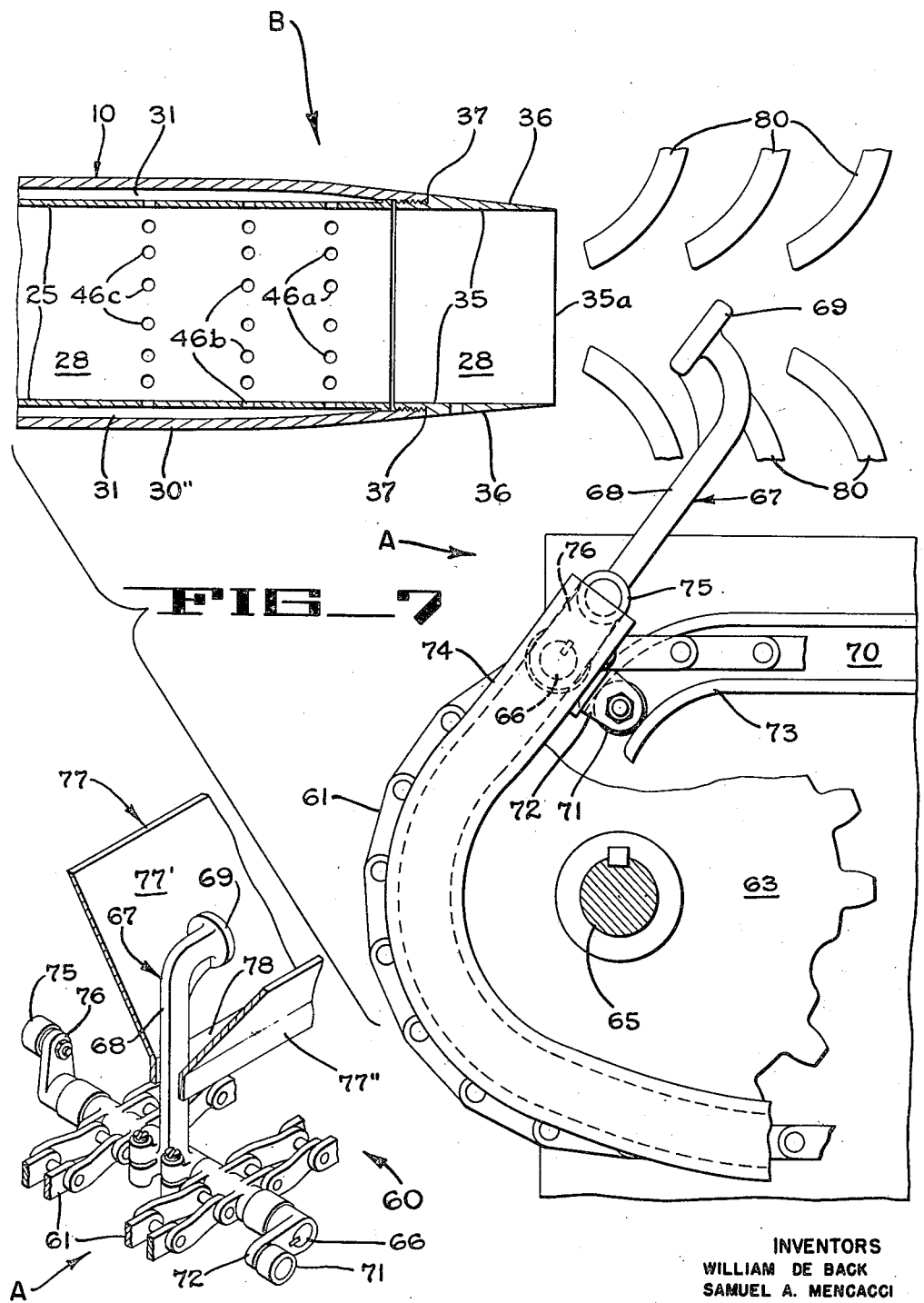

United States Patent Office 2,765,829
Patented Oct. 9, 1956

2,765,829

PINEAPPLE SIZER HAVING COMPRESSED AIR EJECTING MEANS

William de Back, St. Nicolas-Waes, Belgium, and Samuel A. Mencacci, San Jose, Calif., assignors to Food Machinery and Chemical Corporation, San Jose, Calif., a corporation of Delaware Application July 29, 1952, Serial No. 301,568

8 Claims. (Cl. 146—6)

The present invention relates to mechanisms for processing pineapples to remove the edible interior in the form of a cylinder from the outer rind or shell thereof— an operation that is known as pineapple sizing in the art.

It is an object of the invention to provide a pineapple sizing mechanism, of the type referred to, that is simple in construction yet dependable in operation.

Another object is to provide a pineapple sizing mechanism that is capable of sizing a procession of pineapples in rapid succession.

Still another object is to provide a pineapple sizing mechanism adapted to deliver the severed fruit flesh cylinders rapidly to subsequent fruit-handling stations.

Pineapple sizing mechanisms of the type here under consideration usually employ a tubular knife against whose cutting edge the fruit to be sized is pushed so that a cylinder of fruit flesh enters the interior of the tube and in this manner is severed from the rind which slides over the outside thereof. To remove the fruit flesh cylinders from the interior of the tubular knife it has been customary to push fruit after fruit over its cutting edge so that the fruit flesh cylinders entering the tube interior in succession push the preceding fruit flesh cylinders eventually through the opposite end thereof to the outside. Such a procedure is slow and may damage the fruit flesh cylinders by subjecting them to excessive pressures since they are liable to adhere to the inner wall of the tubular knife due to the tackiness of their juices.

It is an additional object of the invention to provide a pineapple sizing mechanism, of the type referred to, that is adapted to eject the severed fruit flesh cylinders rapidly from the interior of the tubular sizing knife without subjecting them to such positive pressures as might damage their texture.

These and other objects of the present invention will be apparent from the following description of the accompanying drawings which illustrate a preferred embodiment thereof and wherein:

Fig. 2 is a partly diagrammatic side elevation of the same machine viewed from the opposite side;

Fig. 3 is an enlarged fragmentary vertical section through the actual fruit sizing mechanism of the machine showing a first pineapple in the process of being sized;

Fig. 4 is an enlarged fragmentary view similar to Fig. 3 showing a second pineapple in the process of being applied to the sizing mechanism;

Fig. 5 is an enlarged fragmentary side elevation, partly in section, of the fruit cylinder receiving turret that adjoins the sizing mechanism illustrated in Figs. 3 and 4;

Fig. 6 is an enlarged front elevation of said turret viewed in the direction of the arrows 6—6 provided in Fig. 1;

Fig. 7 is a vertical section, similar to Figs. 3 and 4, illustrating on an enlarged scale the fruit receiving end of the sizing mechanism and the feed conveyor therefor; and Fig. 8 is a perspective illustrating the manner in which the fruit impellers of the feed conveyor are mounted.

Figure 1:
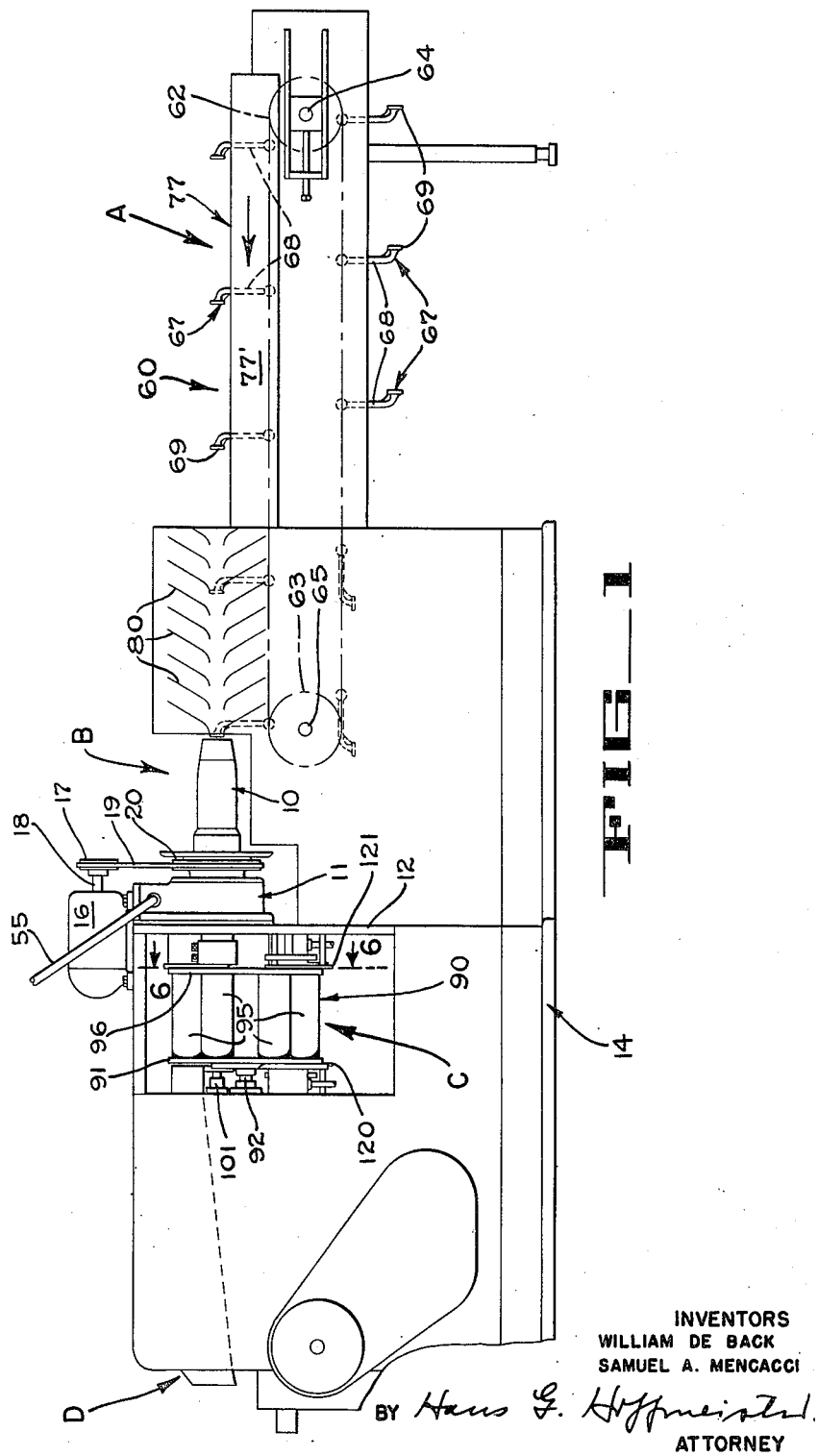
Fig. 1 is a partly diagrammatic side elevation of a pineapple sizing machine embodying the invention.

The pineapple sizing machine illustrated in Figs. 1 and 2 comprises a conveyor A arranged to feed pineapples or like fruit in a continuous procession and in properly aligned position to and against the actual fruit sizing mechanism B which delivers the severed fruit flesh cylinders to a turret C where the cylinders are trimmed and cored and from where they are delivered into a discharge chute D.

The fruit sizing mechanism B is formed by a horizontally positioned tubular knife structure 10 that is rotatably held in a bearing 11 which is suitably supported from a vertical partition 12 of the machine frame 14 within a circular aperture 15 thereof. During operation of the machine, said tubular knife structure is held in a continuous state of rapid rotation about its center axis and for this purpose an electric motor 16 may be mounted on top of the machine frame as shown in Figs. 1 and 2, with a drive pulley 17 on its output shaft 18 operatively connected through a suitable belt 19 to a pulley 20 that is firmly secured to the tubular knife structure 10.

Having specific reference to Fig. 3, the tubular knife structure 10 comprises an inner tube 25 which may be composed of two axially aligned tube sections 25′ and 25″, respectively, that form a smooth cylindrical barrel 28. Said inner tube 25 is surrounded by a tubular jacket 30 in such a manner that an annular space 31 of limited radial width is formed between the tube 25 and the jacket 30. In the particular embodiment of the invention illustrated in Fig. 3 said jacket is formed by two juxtaposed shells 30′ and 30″, respectively, the adjoining inner edges of which are arranged to overlap as shown at 32 to form an airtight seal. The front end of the jacket portion 30‴ is somewhat tapered and projects beyond the front edge of inner tube section 25″. Suitably secured to said projecting front end of the jacket portion 30″, such as by means of screw threads, is a tubular knife 35. The inner surface of said tubular knife is such that it constitutes a straight continuation of the barrel 28 formed by tube segments 25′ and 25″, while its outer conically spreading surface 36 is recessed at its rear end to form a shoulder 37 against which the projecting front edge of the jacket portion 30″ may bear. The rear end of the other jacket portion 30′ is radially contracted to form a collar 38 that fits tightly over the tube section 25′ and engages behind an annular shoulder 39 formed along the outer surface of said tube section. To maintain the jacket 30 and the tube 25 in properly spaced relation the adjoining edges of the tube sections 25′ and 25″ may be provided with a series of outwardly directed lugs 40 and 41, respectively.

In the particular embodiment of the invention illustrated in the accompanying drawings, the aforementioned support 11 for the knife structure 10 is formed by two axially spaced juxtaposed ball bearings 11a and 11b whose inner races 43a and 43b are held in suitable recesses formed in the outer surface of the jacket portion 30′ as shown in Fig. 3, and the aforementioned pulley 20 is secured to an outwardly directed annular flange 44 of said jacket portion 30′ by means of suitable screw bolts 44a. These same bolts may serve to hold a circular shield 45 in front of the pulley 20 to protect it from fruit juices that may be spattered from the knife 35 during the fruit sizing operation.

In accordance with the invention, three axially spaced circular rows of perforations 46a, 46b, and 46c are provided in the inner tube 25 near its front end to establish communication between the annular chamber 31 and the interior of the inner tube 25. During operation of the sizing mechanism compressed air is delivered into the chamber 31 and enters into the interior of the inner tube 25 through said perforations to dislodge fruit flesh cylinders from the front end of the barrel 28 and drive them rearwardly out of said barrel. For this purpose a circular sequence of slots 47 is formed in the rearwardly positioned portion 30' of the jacket 30 intermediately of the recesses that carry the inner races of the ball bearings 11a and 11b, and arranged around said jacket portion 30' is an annular air supply manifold 48. Said manifold may be formed by the stationary annular walls 49a and 49b which receive and support the outer races 50a and 50b of the ball bearings 11a and 11b, in conjunction with an annular disc 51 that adjoins the hereinbefore described partition 12 of the machine frame. Said walls 49a and 49b have inwardly directed lips 52a and 52b that extend into close proximity with the outer surface of the rotating jacket portion 30' and form a relatively narrow annular channel 53 that surrounds said jacket portion in registry with the slots 47 provided therein. The lips 52a and 52b may be designed to form seats for suitable packing rings 54a and 54b that bear against the rotating jacket portion 30'. Thus, when a source of compressed air is connected to the manifold 48, such as by means of the tubular connection 55 shown in Fig. 1, compressed air is delivered into the narrow annular chamber 31 between the jacket 30 and the inner tube 25 of the rotating knife structure 10 and penetrates from there into the barrel 28.

In operation, it is necessary that the pineapples to be sized be brought against the circular edge 35a of the knife 35 with their front or crown ends in axial alignment with the knife structure. Any suitable conveying means may be employed for this purpose, such as the conveyor 60 illustrated in Figs. 1, 2, 3, 7 and 8. Having reference to said figures, such a conveyor may comprise a pair of transversely spaced endless chains 61 trained about pairs of sprockets 62 and 63, respectively. The sprockets 62 may be mounted upon an idler shaft 64 that is suitably journaled in the machine frame, while the sprockets 63 are mounted upon a drive shaft 65 that may likewise be journaled in the machine frame and which is driven from a suitable source of power in such a manner that the chains advance in counterclockwise direction as viewed in Fig. 1. Suitably mounted above the upper horizontal run of the conveyor 60 is a fruit supporting trough 77 that is preferably of V-shaped cross section with its bottom left open, and which may be formed by a pair of relatively inclined planks 77' and 77" whose approached lower edges are spaced from each other to form a longitudinal slot 78. Rotatably held between the chains 61 of the conveyor 60 at predetermined intervals are crossrods 66, and upon each of said crossrods is firmly clamped a fruit impeller element 67 formed by a slender stem 68 that projects upwardly through the slot 78 in the trough 77 and carries on its forwardly bent upper end a circular pusher disc 69 which is adapted to engage the butt end of a fruit placed into the trough. Means are provided to maintain the impellers 67 in an upright position as they travel along the upper horizontal run of the conveyor 60 until their pusher discs 69 move practically into alignment with the vertical plane defined by the circular edge of the knife 35 so that they may force any entrained fruit fully over said knife (Figs. 3 and 4). Upon arrival at the defined position, however, the impellers 67 are arranged to tilt abruptly in backward direction so that their pusher discs will clear the edge of the knife as the conveyor movement carries them around the drive sprockets 63 at the leading end of the conveyer. For this purpose, a horizontal camway 70 may be arranged along the upper horizontal run of the conveyer to be engaged by cam follower rollers 71 that are pivoted to arms 72 which are firmly secured to the adjacent ends of the crossrods 66. While these cam follower rollers travel within the camway 70, the impellers 67 are positively held in an upright position in which they project through the open bottom 78 of the V-shaped trough 77 and push fruit deposited into said trough toward the sizing knife 35, as illustrated in Figs. 1 and 2. However, a limited distance before the leading end of the conveyor 60, the camway 70 curves downwardly, as shown at 73 in Figure 7, which is effective to tilt the pusher arms backwardly as illustrated. In the embodiment of the invention illustrated in the accompanying drawings, the camway 70 terminates with the described downwardly bent portion 73, and to maintain the impellers 67 in reclined position until they have returned to the trailing end of the conveyer, an additional camway 74 may be provided that starts at a point adjoining the downwardly bent end 73 of the first mentioned camway, and which is engaged by cam follower rollers 75 pivoted to arms 76 that are firmly secured to the other ends of the rotatable crossroads 66. Said second camway 74 may end at a point near the trailing end of the conveyor 60 where the aforementioned cam follower rollers 71 reengage the first mentioned camway 70 to project the impellers 67 into their effective position in which they extend through the open bottom of the trough 77 into the interior thereof and positively propel fruit deposited into said trough toward the sizing knife 35.

For the sizing mechanism of the invention to operate properly, it is necessary that the fruit to be sized be delivered against the circular cutting edge 35a of the sizing knife in axially aligned condition, and to this end forwardly converging spring-loaded centering fingers 80 may be arranged around the path of the pusher discs 69 as indicated in Figs. 1, 2, 3 and 7. Fruit centering arrangements of this type do not form part of the present invention and are well known in the art so that it is unnecessary to describe them here in greater detail.

In practical operation of the described machine pineapples are delivered into the conveyer trough 77 with their leaves removed, but with their ends preferably in untrimmed condition. When an impeller 67 brings a pineapple with its crown end in axial aligned position against the circular cutting edge 35a of the rotating knife 10 and impales the fruit upon said knife 35, a cylindrical body of fruit flesh is pushed into the barrel 28. As the advancing impeller 67 forces the fruit fully over the tubular sizing knife, said cylindrical fruit flesh body enters fully into the barrel 28 and will cover at least the first but may possibly also cover the second row of perforations 46a and 46b, respectively, as illustrated in phantom line at Ia in Fig. 3, depending on the axial length of the processed fruit. In the position illustrated at Ia the fruit flesh cylinder will remain until a succeeding impeller 67 forces another fruit upon the tubular knife 35. Then, as the cylinder of said second fruit is pushed into the interior of the rotating sizing knife, it drives the fruit flesh cylinder of the first fruit deeper into the barrel 28 from the position illustrated at Ia in Fig. 3 to the position marked Ib in Fig. 4. As the first fruit flesh cylinder is moved in the described manner it closes the third row of perforations 46c, but as the leading end of the second fruit flesh cylinder approaches the first row of perforations 46a, this row of perforations is uncovered, for the natural ends of fruit of the type here under consideration are never entirely flat; they show invariably a rather pronounced convexity so that there is always an annular space 85 formed between the adjoining ends of two successive fruit flesh cylinders, as may be seen from Fig. 4. Into said space the compressed air delivered into the annular chamber 31 enters with full force through said first row of perforations, and since the second fruit flesh cylinder blocks the front end of the barrel 28 and is positively retained within said barrel by its impeller 67, while the rear end of the barrel 28 is open, the force of the compressed air released into the barrel 28 drives the first fruit flesh cylinder toward and out of the rear end of said barrel; and as the first fruit flesh cylinder is driven through the barrel 28 in the described manner, it uncovers in quick succession the perforations in the second and third row of perforations 46b and 46c, respectively, so that compressed air may continue to enter the barrel 28 behind the first fruit flesh cylinder and drive it dependably from the barrel even though the second fruit flesh cylinder, as it advances under the force of its impeller 67, may presently close the first and second row of perforations. From the above it will be apparent that it is preferable to always have a first row of perforations, such as 46a, spaced from the cutting edge 35a of the sizing knife by a distance less than the axial length of the shortest specimen of the fruit to be sized, in order that any fruit forced onto the sizing knife may dependably push the preceding fruit flesh cylinder past said first row of perforations and thus initiate the described ejection of said fruit flesh cylinder. It also will be of advantage to always have another row of perforations, such as 46c, spaced from the cutting edge of the sizing knife by a distance larger than the axial length of the longest specimen of the fruit to be sized, to be sure that no newly inserted fruit cylinder will ever cover all the perforations behind a preceding fruit flesh cylinder that is in the process of ejection.

To receive the fruit cylinders driven from the barrel 28, in a manner protecting them from harmful impacts, a turret 90 is mounted for rotation about a horizontal axis adjacent the discharge end of the knife structure 10. Having reference to Figs. 1, 2, 5 and 6, said turret may comprise a base in the form of a vertically positioned disc 91 which is firmly mounted upon a horizontal shaft 92 extending parallel to the center axis of the knife structure 10 and journaled in a vertical wall or partition 93 of the machine frame at preferably a somewhat lower level than said center axis. In the embodiment of the invention illustrated in the accompanying drawings said disc contains six circular apertures 94 spaced equal angular distances apart, each being of about the same diameter as the diameter of the barrel 28. Rigidly secured to the base disc 91 in registry with said circular apertures are an equal number of horizontally positioned, open-ended tubular sockets 95 whose opposite ends are rigidly held in their proper relation by an annular flange 96. In a radial direction the location of the aforementioned shaft 92 relative to the center axis of the knife structure 10 is such that when said shaft is turned, each of said sockets 95 comes successively into registry with the barrel 28. Longitudinally of the machine the location of the described turret 90 relative to the discharge end of the knife structure 10 is such that whenever a tubular socket 95 is in registry with the barrel 28 of said knife structure, the fruit cylinder receiving end of said socket is located adjacent to but somewhat spaced from the discharge end of said barrel. Located adjacent to but spaced slightly from the opposite or bottom end of a tubular socket in registry with the barrel 28 is a stationary buffer plate 99 mounted on a short threaded stem 100 that is received in a threaded socket 101 which is bolted to the aforementioned vertical wall 93 of the machine frame.

The space left between the bottom end of a registering socket 95 and the buffer plate 99 determines the rate at which the air in front of an ejected fruit cylinder may escape, and by making this space small so that the air in front of an ejected fruit flesh cylinder cannot readily escape, the ejection of the fruit cylinders into the sockets 95 is cushioned so that they will not strike the buffer plate 99 with excessive force and become bruised or bounce back into the barrel 28. To regulate the described cushioning effect the distance between the buffer plate 99 and the base disc 91 of the turret 90 may be varied by turning the threaded stem 100 of the buffer plate in its socket 101.

The space left between the discharge end of the barrel 28 and the receiving end of a registering turret socket 95 serves primarily to permit escape, and thus weaken the force, of the propelling air blast behind a fruit cylinder once it has passed from the barrel 28 into a turret socket 95. To control the effect of said last mentioned air space a collar band 102 may be slidably disposed about the discharge end of the tube 25 and may be clamped in adjusted position about said end by means of clamping screws indicated at 103 in Figs. 3 and 5.

During operation of the machine when fruit cylinder after fruit cylinder is ejected from the barrel 28 in the manner previously described, as the conveyor 60 delivers fruit after fruit against the sizing knife 35, the turret 90 is rotated intermittently in timed relation with the arrival of the impellers 67 in front of said knife in such a manner that whenever the impalement of a newly supplied fruit frees the cylinder of a preceding fruit for ejection by the compressed air entering the interior of the barrel 28 through the peforations 46a, 46b, 46c and the ejected cylinder reaches a registering socket 95, the turret turns on its shaft 92 over an arc that will place a succeeding socket into registry with the barrel 28. For this purpose, both the conveyor 60 and the turret 90 are preferably driven from a common source of power as illustrated in Fig. 2.

Having specific reference to said Fig. 2 a suitable power train 105 is arranged to transmit the rotary power of an electric motor 106 mounted upon the machine pedestal 107 to a longitudinal spindle 108 that is rotatably supported in the end wall 109 and in the hereinbefore mentioned partition 93 of the machine. Another power train 110 operatively connects the spindle 108 with the rear end of a longitudinal shaft 111 that is rotatably supported along the outside of the machine. At its front end said shaft 111 carries a worm 112 that is engaged by a worm gear 114 which is firmly mounted upon and drives the hereinbefore mentioned drive shaft 65 of the conveyor 60. A third power train 115 connects the spindle 108 operatively to the driver 116 of a Geneva gear 117 which is mounted upon the hereinbefore mentioned shaft 92 of the turret 90 and which drives said turret intermittently in such a relation to the continuous operation of the conveyor 60 that a new socket 95 is moved into registry with the barrel 28 of the knife structure 10 whenever an impeller on the conveyor 60 has pushed a fruit onto the sizing knife and thus released a preceding fruit flesh cylinder for delivery into a turret socket.

In the turret 90 the fruit cylinder may be trimmed in the usual manner at its crown and butt ends, such as by means of stationary knives 120 and 121, and may also be cored and then ejected by means of a suitable air jet into the hereinbefore mentioned inclined discharge trough D. Trimming and coring turrets of this type are, in themselves, well known in the art and do not form part of the present invention so that it is unnecessary to describe them here in greater detail.

In practical operation of the described machine, the electric motor 106 is started to drive the conveyor 60 and the turret 90 in the defined relation. A source of compressed air is applied to the connection 55. Additionally the electric motor 16 is energized to rotate the sizing knife at a rapid rate, and pineapples are then fed successively into the trough 77 of the conveyor 60 in front of the impellers 67. This may be done manually or by a suitable feed hopper (not shown). As an impeller 67 propels a fruit along the trough 77 toward the sizing knife, said fruit enters the space between the aligning fingers 80 pressing them apart against the action of their biasing springs. In this manner the fruit approaches the circular cutting edge of the sizing knife in properly centered position while riding on and between said centering fingers, and is forced over said sizing knife while in axial alignment therewith. As soon as the fruit is pushed fully over the sizing knife, and the pusher disc 69 of its impeller 67 enters the vertical plane determined by the circular edge of the sizing knife (Fig. 3), its roller 71 traveling in camway 70 enters the downwardly curved end thereof, which is effective to tilt the impeller abruptly in backward direction so that it may clear the sizing knife as it advances with the conveyor chains. At the same time the roller 75 enters the return camway 74 which holds the impeller in its backwardly tilted position until it reaches again the trailing end of the conveyor where the camway 75 ends and the first mentioned roller 71 re-enters the camway 70 which projects the impeller again into its effective fruit-propelling position.

When a pineapple has been pushed fully over the sizing knife, it is divided into two portions, a cylinder of fruit flesh that is situated within the hollow interior of the sizing knife, and its rind or crust which sits in the form of an annulus upon the outside of the cutting knife. A longitudinally extending radially directed blade (not shown) may be mounted adjacent the outer surface of the sizing knife so that the annular rind may be ripped open and readily fall from said knife as a succeeding fruit pushes it further along the conically diverging outer surface of said knife.

Reverting to the fruit cylinder within the knife, the location of the first row of perforations 46a in the wall of the inner tube 25 should preferably be so chosen that it may be reached and covered up by the fruit flesh cylinder of even a fruit of relatively short axial length when said fruit is first forced over the sizing knife (Fig. 3), as has been pointed out hereinbefore. Thus, whenever a fruit is pushed over the sizing knife, it will push a fruit cylinder previously inserted into the barrel 28 past the first row of perforations 46a which opens said perforations for a brief period of time and thus initiates the ejection of said fruit flesh cylinder in the manner previously described. The fruit flesh cylinder shot out of the barrel 28 is received within a registering socket 95 of the turret 90, its force of projection being cushioned by the air in front thereof depending upon the size of the gap between the buffer plate 99 and the bottom end of the socket, while the force of the projecting air blast behind the fruit cylinder is, at the proper moment, relaxed to an extent depending on the size of the annular gap between the discharge end of the barrel 28 and the receiving end of the socket. As soon as the ejected fruit flesh cylinder has come to a halt within the registering socket 95, and as the next succeeding impeller 67 in the conveyor 60 delivers another fruit to the sizing knife, the turret 90 rotates about its horizontal axis to remove the filled socket from the end of the barrel 28 and to place a succeeding socket in registry therewith to receive the next fruit cylinder.

By the described mechanism large amounts of pineapples may be rapidly processed without manual labor of any kind either to deliver the fruit to the sizing knife or to remove the severed cylinders from the interior thereof, and without congestion within the tubular interior of the knife such as might subject the fruit flesh cylinders to harmful pressures or cause machine failures.

While I have described my invention with the aid of a particular embodiment thereof, it will be understood that I do not wish to be limited to the specific constructional details illustrated and described which may be departed from without departing from the scope and spirit of my invention.

What we claim is:

1. A sizing mechanism for pineapples comprising a tube, a circular cutting edge provided at one end of said tube, means operable to deliver the fruit against said cutting edge in axial alignment with said tube, and means for delivering compressed air into the interior of said tube from a lateral point thereof removed from said cutting edge by a distance less than the axial length of the fruit to be sized.

2. A sizing mechanism for pineapples comprising a tube, a circular cutting edge provided at one end of said tube, means operable to deliver pineapples against said cutting edge in axial alignment with said tube, and means for delivering compressed air into the interior of said tube at first and second lateral points thereof, said first point being removed from said cutting edge by a distance less than the axial length of the fruit and said second point being removed from said cutting edge by a distance greater than the axial length of the fruit.

3. A sizing mechanism for pineapples comprising a tube, a circular cutting edge provided at one end of said tube, means operable to rotate said tube about its center axis, means for delivering compressed air into the interior of said tube at a lateral point thereof adjacent said cutting edge, and means operable to deliver a procession of pineapples successively against said cutting edge in axial alignment with said tube.

4. A sizing mechanism for pineapples comprising a tube, a cutting edge provided at one end of said tube, a jacket surrounding said tube and forming an annular chamber therewith, a sequence of axially spaced rows of apertures provided in said tube a limited distance inwardly from the cutting edge thereof to establish communication between said chamber and said tube, means for delivering compressed air into said chamber, means operable to deliver pineapples successively against said cutting edge in axial alignment therewith to sever cylinders of fruit flesh from the rinds of the fruit, and means adjacent the rear edge of said tube for receiving the fruit flesh cylinders discharged from said tube under the force of the compressed air entering the interior of said tube through said apertures.

5. A sizing mechanism for pineapples comprising a cylindrical tube having a front and a rear end, a cutting edge provided at said front end, a jacket surrounding said tube and forming an annular chamber therewith, apertures provided in said tube adjacent the front end thereof to establish communication between said chamber and said tube, means for delivering compressed air into said chamber, means operable to deliver pineapples successively against said cutting edge in axial alignment with said tube to sever cylinders of fruit flesh from the rinds of the fruit, socket means spaced from the rear end of said tube for receiving the fruit flesh cylinders discharged from said tube under the force of the compressed air entering the interior of said tube through said apertures, and means for varying the gap between the rear end of said tube and said socket means.

6. Mechanism for sizing pineapples including a knife structure comprising a cylindrical tube having a front and a rear end, a cutting edge provided at the front end of said tube and a jacket surrounding said tube and forming an annular chamber therewith, said tube having a sequence of axially spaced rows of perforations to establish communication between said annular chamber and the interior of the tube; means for delivering compressed air into said annular chamber; means for positively delivering pineapples successively against said cutting edge in axial alignment therewith to sever cylinders of fruit flesh from the rinds of the fruit and to advance the cylinders into the tube beyond one of said rows of perforations; an open-ended tubular socket arranged at the rear end of said tube with its receiving end spaced from the rear end of said tube; and buffer means axially spaced from the rear end of said socket.

7. Mechanism for sizing pineapples including a knife structure comprising a cylindrical tube having a front and a rear end, a cutting edge provided at the front end of said tube, and a jacket surrounding said tube to form an annular chamber therewith, said tube having a sequence of axially spaced rows of perforations to establish communication between said annular chamber and the interior of the tube, the foremost one of said rows of perforations being spaced from said cutting edge by a distance less than the length of the fruit to be sized; means for delivering compressed air into the annular chamber of said knife structure; means for positively delivering fruit successively against said cutting edge in axial alignment therewith to sever cylinders of fruit flesh from the rinds of the fruit; an open-ended tubular socket arranged at the rear end of said tube with its receiving end spaced from the rear end of said tube; means for varying the gap between the rear end of said tube and the receiving end of said socket; and buffer means axially spaced from the rear end of said socket and adjustable to vary its distance from the rear end of said socket.

8. Mechanism for sizing pineapples including a tube having a front and a rear end, a cutting edge provided at the front end of said tube and a jacket surrounding said tube and forming an annular chamber therewith, said tube having a row of perforations to establish communication between said annular chamber and the interior of the tube; means for delivering compressed air into said annular chamber; means for positively delivering pineapples in succession against said cutting edge in axial alignment with said tube; an open-ended tubular socket arranged at the rear end of said tube in axial alignment therewith; and buffer means axially spaced from the rear end of said socket.

References Cited in the file of this patent

UNITED STATES PATENTS

| | | |
|---|---|---|
| 1,282,402 | Fenn | Oct. 22, 1918 |
| 1,463,114 | Bostrom | July 24, 1923 |
| 1,565,648 | Hoyt | Dec. 15, 1925 |
| 2,195,193 | Stanley | Mar. 26, 1940 |
| 2,624,641 | Smith | Jan. 6, 1953 |
| 2,652,915 | Fox | Sept. 22, 1953 |

FOREIGN PATENTS

| | | |
|---|---|---|
| 19,783 | Great Britain | Aug. 29, 1912 |
| 11,590 | Great Britain | Aug. 11, 1915 |